(12) United States Patent
Yamane et al.

(10) Patent No.: US 11,630,933 B2
(45) Date of Patent: Apr. 18, 2023

(54) TRAINING DATA GENERATING METHOD AND COMPUTING SYSTEM

(71) Applicant: FUJITSU LIMITED, Kawasaki (JP)

(72) Inventors: Shohei Yamane, Kawasaki (JP);
Hiroaki Yamada, Kawasaki (JP);
Takashi Yamazaki, Kawasaki (JP);
Yoichi Kochibe, Chiba (JP); Toshiyasu Ohara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/469,777

(22) Filed: Sep. 8, 2021

(65) Prior Publication Data
US 2022/0138380 A1 May 5, 2022

(30) Foreign Application Priority Data
Oct. 29, 2020 (JP) .............................. JP2020-181670

(51) Int. Cl.
*G06F 30/27* (2020.01)
*G06F 30/398* (2020.01)
*G06F 119/10* (2020.01)

(52) U.S. Cl.
CPC ............ *G06F 30/27* (2020.01); *G06F 30/398* (2020.01); *G06F 2119/10* (2020.01)

(58) Field of Classification Search
CPC ...... G06F 30/27; G06F 30/367; G06F 30/398; G06F 2119/10; G06F 30/23; G06F 30/36
See application file for complete search history.

(56) References Cited

U.S. PATENT DOCUMENTS

| | | | | |
|---|---|---|---|---|
| 9,507,905 B2* | 11/2016 | Hiratsuka | ............. | G06F 30/398 |
| 10,643,018 B1* | 5/2020 | Zhang | .................. | G06F 30/398 |
| 10,936,781 B1* | 3/2021 | Ma | ........................ | G06F 30/392 |
| 11,157,676 B2* | 10/2021 | Dantu | ..................... | H01L 23/52 |
| 11,415,637 B2* | 8/2022 | Sarlashkar | ......... | G01R 31/3835 |
| 2004/0250222 A1 | 12/2004 | Saito | ........................ | G06F 30/33 716/115 |
| 2005/0108671 A1* | 5/2005 | Becker | ................. | H05K 1/0231 716/122 |

(Continued)

FOREIGN PATENT DOCUMENTS

| | | |
|---|---|---|
| JP | 2007-011629 A | 1/2007 |
| JP | 2009-151363 A | 7/2009 |
| JP | 2020-060877 A | 4/2020 |

OTHER PUBLICATIONS

Extended European Search Report dated Mar. 2, 2022 for corresponding European Application No. 21194564.7, 8 pages.

(Continued)

*Primary Examiner* — Nha T Nguyen
(74) *Attorney, Agent, or Firm* — Fujitsu Patent Center

(57) ABSTRACT

An information processing apparatus specifies a first pattern indicating a first layer included in first circuit data. The information processing apparatus generates, based on first wiring included in a second pattern indicating a second layer that is adjacent to the first layer and a slit included in the first pattern, second circuit data by changing the first pattern to a third pattern including second wiring corresponding to the first wiring. The information processing apparatus generates, based on the second circuit data, training data for machine learning.

11 Claims, 10 Drawing Sheets

(56) References Cited

U.S. PATENT DOCUMENTS

| | | | | |
|---|---|---|---|---|
| 2012/0041748 A1* | 2/2012 | Orihara | ............... | G06F 30/367 |
| | | | | 703/14 |
| 2012/0192140 A1* | 7/2012 | Sadamatsu | ............. | G06F 30/39 |
| | | | | 716/137 |
| 2015/0278422 A1* | 10/2015 | Hiratsuka | ............ | G06F 30/398 |
| | | | | 716/126 |
| 2020/0110850 A1 | 4/2020 | Yamane et al. | | |
| 2020/0367356 A1* | 11/2020 | Koshio | ................... | H05K 1/18 |
| 2022/0027536 A1* | 1/2022 | Dutta | .................... | G06N 20/00 |
| 2022/0138381 A1* | 5/2022 | Yamane | ............... | G06F 30/367 |
| | | | | 716/110 |

OTHER PUBLICATIONS

Wu, Tzong-Lin et al., "Overview of Signal Integrity and EMC Design Technologies on PCB: Fundamentals and Latest Progress", IEEE Transactions on Electromagnetic Compatibility, vol. 55, No. 4, Aug. 1, 2013, pp. 624-638, XP011521613.

Sayegh, Ahmed et al., "Neural Network Based Model for Radiated Emissions Prediction from High Speed PCB Traces", Proceedings of the International IEEE Conference on Computer, Communications, and Control Technology, Sep. 2, 2014, pp. 320-323, XP032741908.

\* cited by examiner

TRAINING DATA GENERATING METHOD AND COMPUTING SYSTEM

CROSS-REFERENCE TO RELATED APPLICATION

This application is based upon and claims the benefit of priority of the prior Japanese Patent Application No. 2020-181670, filed on Oct. 29, 2020, the entire contents of which are incorporated herein by reference.

FIELD

The embodiments discussed herein are related to a training data generating method and a computing system.

BACKGROUND

When an electric current flows through an electronic circuit, electromagnetic waves will be emitted from the electronic circuit. Some products that include electronic circuits are regulated to ensure that the intensity of the emitted electromagnetic waves is below a threshold. Electronic circuits are therefore designed so as to comply with regulations on electromagnetic waves. As one example, EMI (Electromagnetic Interference) is used as an index for the intensity of electromagnetic waves.

One method of estimating the intensity of electromagnetic waves at the design stage is to have a computer perform a physical simulation to analyze how electromagnetic waves will be emitted. However, physical simulations have a high computational load and take a long time. For this reason, there is another method where a computer estimates the intensity of electromagnetic waves from circuit data using a model that has been generated by machine learning. The model may be a neural network generated by deep learning (DL), tor example. Estimation using the model has a lighter computational load than physical simulation and produces an estimation result in a short time.

A return path checking system for detecting, during the design stage of a printed circuit board, a path on which a return current will flow corresponding to wiring has been proposed. A circuit board design apparatus that detects a current loop path from printed circuit board data and estimates electromagnetic noise that will be emitted from the printed circuit board based on the area of the current loop path has also been proposed.

Related arts are disclosed in Japanese Laid-open Patent Publication No. 2007-11629, Japanese Laid-open Patent Publication No. 2009-151363, and Japanese Laid-open Patent Publication No. 2020-60877.

SUMMARY

According to an aspect, there is provided a non-transitory computer-readable recording medium storing therein a computer program executable by one or more computers. The computer program includes: an instruction for specifying a first pattern indicating a first layer included in first circuit data; an instruction for generating, based on first wiring included in a second pattern indicating a second layer that is adjacent to the first layer and a slit included in the first pattern, second circuit data by changing the first pattern to a third pattern including second wiring corresponding to the first wiring; and an instruction for generating, based on the second circuit data, training data for machine learning.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A model for estimating the emission of electromagnetic waves is generated by machine learning based on training data. The accuracy of the generated model depends on the type of data used as inputs into the model. The type of data used as training data is therefore important for machine learning.

The electronic circuits referred to here may have a plurality of layers. A layer may be a wiring layer including wiring through which a current flows. A layer adjacent to the wiring layer may include a large conductor region. One example of a layer with a large conductor region is a ground plane layer. When a current flows through the wiring on the wiring layer, a return current will flow through a part of the conductor region on the adjacent layer. Return currents affect the electromagnetic waves emitted by an electronic circuit. This means that when training data does not include information relating to return currents, the accuracy of the model is likely to fall.

Figure 1:
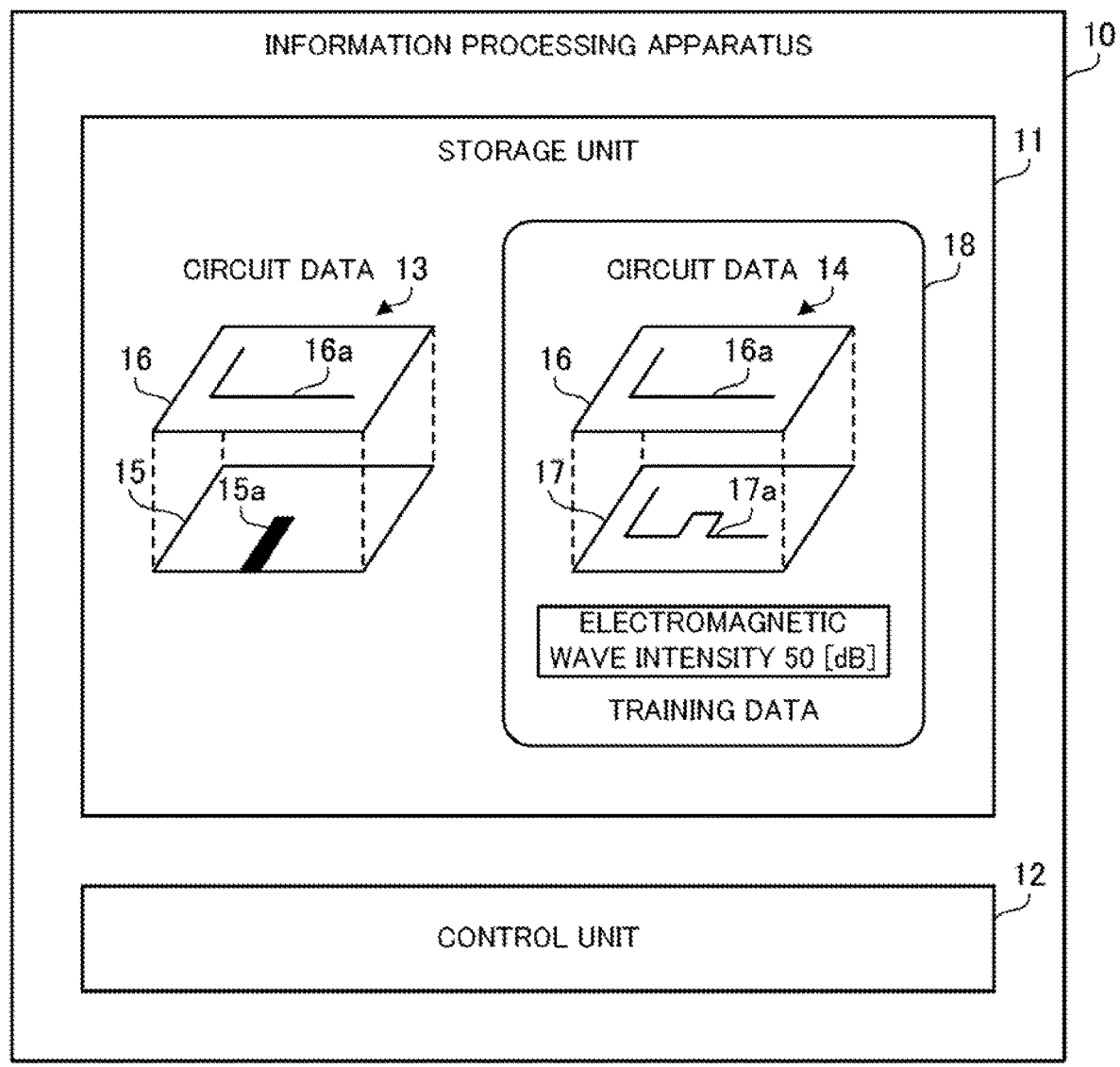
FIG. 1 depicts an information processing apparatus according to the first embodiment.

Several embodiments will be described below with reference to the accompanying drawings. First, a first embodiment will be described. FIG. 1 depicts an information processing apparatus according to the first embodiment. The information processing apparatus 10 according to the first embodiment generates training data to be used in machine learning. The information processing apparatus 10 may also execute the machine learning itself using the generated training data. Alternatively, the information processing apparatus 10 may have a different information processing apparatus execute the machine learning. The information processing apparatus 10 may be a client apparatus or a server apparatus. The information processing apparatus 10 may be referred to as a "computer", a "training data generating apparatus", or a "machine learning apparatus".

The information processing apparatus 10 includes a storage unit 11 and a control unit 12. The storage unit 11 may be a volatile semiconductor memory, such as a RAM (Random Access Memory). The storage unit 11 may be non-volatile storage, such as an HDD (Hard Disk Drive) or a flash memory. The control unit 12 may be a processor, such as a CPU (Central Processing Unit), a GPU (Graphics Processing Unit), or a DSP (Digital Signal Processor). The control unit 12 may include an electronic circuit, such as an ASIC (Application Specific Integrated Circuit) or an FPGA (Field Programmable Gate Array). The processor executes a program stored in a memory (as one example, the storage unit 11). A group of processors may be referred to as a "multiprocessor" or simply as "the processor".

The storage unit 11 stores circuit data 13 indicating the physical design of an electronic circuit. The circuit data 13 includes the respective patterns of a plurality of layers. Each pattern indicates the structure of the surface, such as wiring, vias, slits, conductor regions, and non-conductor regions. A group of layers may include a wiring layer, a ground layer, and a power supply layer. The wiring layer includes wiring, which is formed of conductors on which currents may flow. Empty regions on the wiring layer are covered with a non-conductor. The ground layer and empty regions on the power supply layer are covered with a conductor. A ground layer with a large conductor region is sometimes referred to as a "ground plane layer". The ground layer and the power supply layer may include silts. A slit is not covered with a conductor. A rectangular slit will contact a conductor on three or four sides.

As one example, the circuit data 13 includes patterns 15 and 16. The pattern 15 has a large conductor region. As one example, the pattern 15 indicates a ground plane layer and includes a slit 15a. The slit 15a contacts a conductor on three sides. The pattern 16 indicates a wiring layer disposed adjacent to the layer indicated by the pattern 15. As one example, the pattern 16 indicates a "first layer" and the pattern 15 indicates a "second layer". The pattern 16 includes wiring 16a. When a current flows through the wiring 16a of the pattern 16, a return current flows through part of the conductor region of the pattern 15. As a general rule, the return path on which the return current flows will be formed at a position corresponding to the wiring 16a. However, the return current may be obstructed by the slit 15a. In this case, the return path will take a bypass route that bypasses the slit 15a.

The control unit 12 generates training data 18 for machine learning based on the circuit data 13. The training data 18 includes feature data corresponding to inputs into the model and teacher data corresponding to correct values for the output of the model. Feature data is sometimes referred to as "explanatory variables", and teacher data is sometimes referred to as "objective variables". The model generated from the training data 18 is an electromagnetic wave estimation model that estimates, from the features of the circuit structure, electromagnetic waves emitted by an electronic circuit. The model may be a neural network, and the machine learning may be deep learning. As one example, the output of the model may be the intensity at electromagnetic waves at a position a predetermined distance from the electronic circuit. Correct values for the intensity of electromagnetic waves may be measured using an electronic circuit implemented based on the circuit data 13. Alternatively, correct values for the intensity of electromagnetic waves may be calculated by a physical simulation.

When generating the training data 18, the control unit 12 specifies the pattern 15 indicating one layer included in the circuit data 13. As one example, the control unit 12 specifies the pattern of a layer, such as a ground plane layer, where empty regions are covered with a conductor. The control unit 12 also specifies the pattern 16 indicating another layer which is adjacent to this layer. The control unit 12 generates circuit data 14 by changing the pattern 15 to the pattern 17 based on the wiring 16a included in the pattern 16 and the slit 15a included in the pattern 15. As one example, the circuit data 14 includes the pattern 16 that corresponds to the first layer and the pattern 17 that corresponds to the second layer.

The pattern 17 includes wiring 17a that corresponds to the wiring 16a. The wiring 17a may indicate the return path of a return current generated by a current flowing through the wiring 16a. The position of the wiring 17a in the pattern 17 may be the same as the position of the wiring 16a in the pattern 16. However, in cases where wiring that is the same as the wiring 16a would cross the slit 15a, the wiring 17a instead bypasses the slit 15a. The electrical properties, such as resistance, of the conductor region of the pattern 15 usually tend to be uniform. On the other hand, a return current will usually flow on a path with the lowest electrical resistance. This means that the shortest path may be used in a section where the slit 15a is bypassed.

As one example, the control unit 12 draws a line on the pattern 15 with the same shape and at the same position as the wiring 16a. When part of the drawn line overlaps the slit 15a, the control unit 12 detects two end points corresponding to intersections between the drawn line and edges of the slit 15a. The control unit 12 then searches for a bypass route, which is a route that connects the two end points and bypasses the slit 15a. In this example, the bypass route found by the control unit 12 is the shortest route, i.e., the route with the shortest length. The wiring 17a is composed of lines in sections where the slit 15a is not overlapped and a line indicating the bypass route.

The control unit 12 generates the training data 18 based on the circuit data 14. As one example, the control unit 12 converts each of the patterns 16 and 17 into a two-dimensional bitmap image. As one example, the control unit 12 generates a two-dimensional bitmap image corresponding to the pattern 16 so that pixels at positions passed by the wiring 16a are "1" and other pixels are "0". As a further example, the control unit 12 generates a two-dimensional bitmap image corresponding to the pattern 17 so that pixels at positions passed by the wiring 17a are "1" and other pixels are "0".

As one example, the images corresponding to the respective patterns are one hundred vertical pixels by one hundred horizontal pixels in size. The input data included in the training data 18 may be a tensor with a number of channels corresponding to the number of layers. Accordingly, the input data included in the training data 18 may be a tensor with one hundred vertical elements by one hundred horizontal elements on two channels, for example. Note that the control unit 12 may edit the images corresponding to the respective patterns to improve the accuracy of the model.

As one example, the control unit 12 may change elements at positions passed by the wiring 16a to numerical values representing the length of the wiring 16a. In the same way, the control unit 12 may change elements at positions passed by the wiring 17a to numerical values representing the length of the wiring 17a. Images that have been processed in this way reflect a physical characteristic whereby the longer the wiring 16a, the higher the intensity of electromagnetic waves in the vicinity. The control unit 12 may also change the elements near the wiring 16a to numerical values exhibiting gradual attenuation as the distance from the wiring 16a increases. In the same way, the control unit 12 may change the elements near the wiring 17a to numerical values exhibiting gradual attenuation as the distance from the wiring 17a increases. Images that have been processed in this way reflect the intensity of electromagnetic waves in the vicinity of the wiring 16a.

In this way, the information processing apparatus 10 generates the training data 18 for generating a model that estimates the emission of electromagnetic waves from the features of a circuit structure. By doing so, it becomes possible for an information processing system to estimate the emission of electromagnetic waves by an electronic circuit under design, using a model that has been generated by machine learning. This means the designer of the electronic circuit is freed from having to implement the electronic circuit under design and measure the intensity of electromagnetic waves. Additionally, there is no need for the information processing system to execute a simulation of electromagnetic waves, which would have a large computational load. This means that the designer is able to quickly obtain information on the emission of electromagnetic waves.

The training data 18 also includes information regarding a return current that flows through a layer adjacent to the wiring layer (for example, a ground layer or a power layer). To represent a return current, the information processing apparatus 10 adds virtual wiring to the circuit data 13, which improves the accuracy of the model generated from the training data 18. When the adjacent layer includes a slit, the information processing apparatus 10 determines the virtual wiring so as to bypass the slit. Accordingly, the virtual wiring accurately represents an actual return path.

Figure 2:
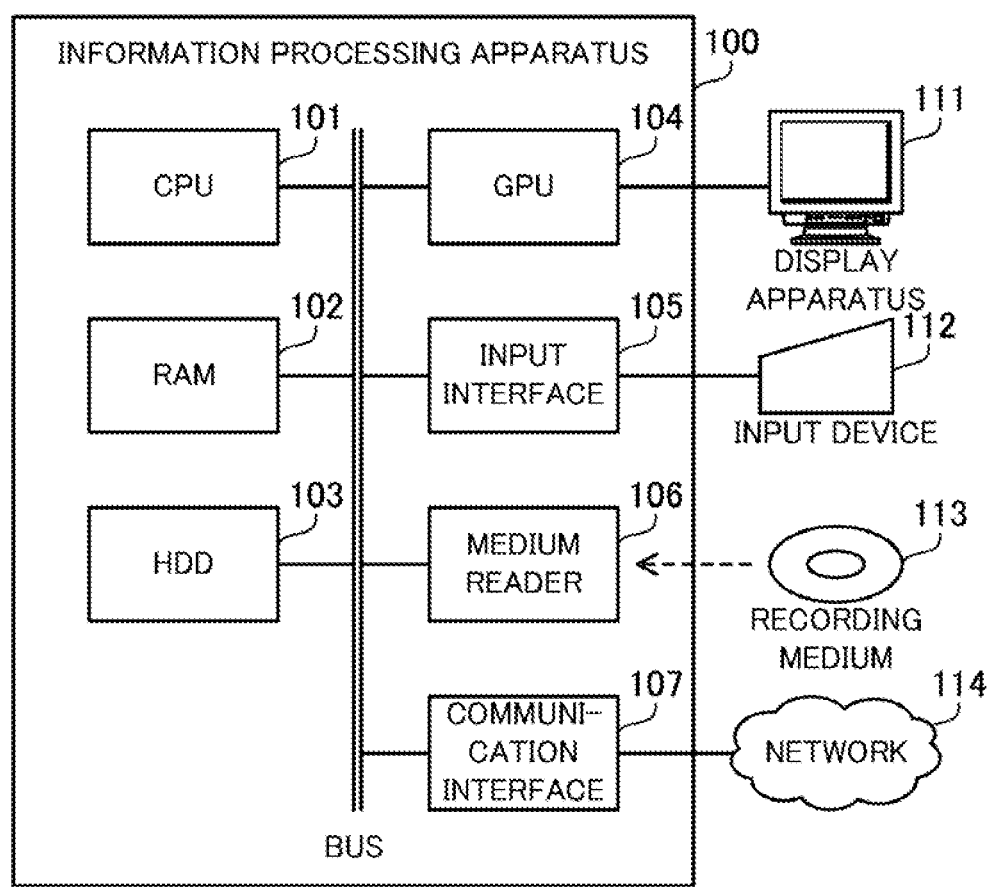
FIG. 2 depicts example hardware of an information processing apparatus according to the second embodiment.

Next, a second embodiment will be described. FIG. 2 depicts example hardware of an information processing apparatus according to the second embodiment. The information processing apparatus 100 includes a CPU 101, a RAM 102, an HDD 103, a GPU 104, an input interface 105, a medium reader 106, and a communication interface 107. The information processing apparatus 100 corresponds to the information processing apparatus 10 according to the first embodiment. The CPU 101 corresponds to the control unit 12 in the first embodiment. The RAM 102 or the HDD 103 corresponds to the storage unit 11 in the first embodiment.

The CPU 101 is a processor that executes instructions of a program. The CPU 101 loads at least a part of the program and data stored in the HDD 103 into the RAM 102 and executes the program. The information processing apparatus 100 may have a plurality of processors. A group of processors may be referred to as a "multiprocessor" or simply as "the processor".

The RAM 102 is a volatile semiconductor memory that temporarily stores programs to be executed by the CPU 101 and data used in computation by the CPU 101. The information processing apparatus 100 may have a type of memory aside from RAM, and may have a plurality of memories.

The HDD 103 is non-volatile storage that stores data and software programs, such as an OS (Operating System), middleware, and application software. The information processing apparatus 100 may have other types of storage, such as flash memory and an SSD (Solid State Drive), and may have a plurality of storage devices.

In accordance with instructions from the CPU 101, the GPU 104 outputs images to a display apparatus 111 connected to the information processing apparatus 100. As examples, the display apparatus 111 is a CRT (Cathode Ray Tube) display, a liquid crystal display (LCD), an organic EL (Electro-Luminescence) display, or a projector. It is also possible to connect another type of output device, such as a printer, to the information processing apparatus 100.

The input interface 105 receives an input signal from an input device 112 connected to the information processing apparatus 100. As examples, the input device 112 is a mouse, a touch panel, or a keyboard. A plurality of input devices may be connected to the information processing apparatus 100.

The medium reader 106 is a reader apparatus that reads programs and data recorded on a recording medium 113. As examples, the recording medium 113 is a magnetic disk, an optical disc, or a semiconductor memory. Magnetic disks include flexible disks (FD) and HDD. Optical discs include CD (Compact Discs) and DVD (Digital Versatile Discs). The medium reader 106 copies the programs and data read out from the recording medium 113 into another recording medium, such as the RAM 102 and/or the HDD 103. The program that has been read out may be executed by the CPU 101.

The recording medium 113 may be a portable recording medium and may be used to distribute programs and data. The recording medium 113 and the HDD 103 may be referred to as "computer-readable recording media".

The communication interface 107 is connected to the network 114. The communication interface 107 communicates with another information processing apparatus via the network 114. The communication interface 107 may be a wired communication interface connected to a wired communication apparatus, such as a switch or a router. Alternatively, the communication interface 107 may be a wireless communication interface connected to a wireless communication apparatus, such as a base station or an access point.

The information processing apparatus 100 supports the designing of electronic circuits. The information processing apparatus 100 may be a client apparatus or a server apparatus. The information processing apparatus 100 generates a model by machine learning. The model estimates, from circuit data of an electronic circuit, the intensity of electromagnetic waves at a position a predetermined distance (for example, 10 meters) from the electronic circuit. The distance is set for example according to the regulations relating to electromagnetic radiation in each country. The information processing apparatus 100 uses the model to estimate the intensity of electromagnetic waves emitted by an electronic circuit under design.

In the second embodiment, the information processing apparatus 100 performs all three of generation of training data, generation of a model, and estimation of the intensity of electromagnetic waves. However, it is also possible for a plurality of information processing apparatuses to divide up the tasks of generating training data, generating a model, and estimating the intensity of electromagnetic waves. The processing flow of estimating the intensity of electromagnetic waves using machine learning will now be described.

Figure 3:
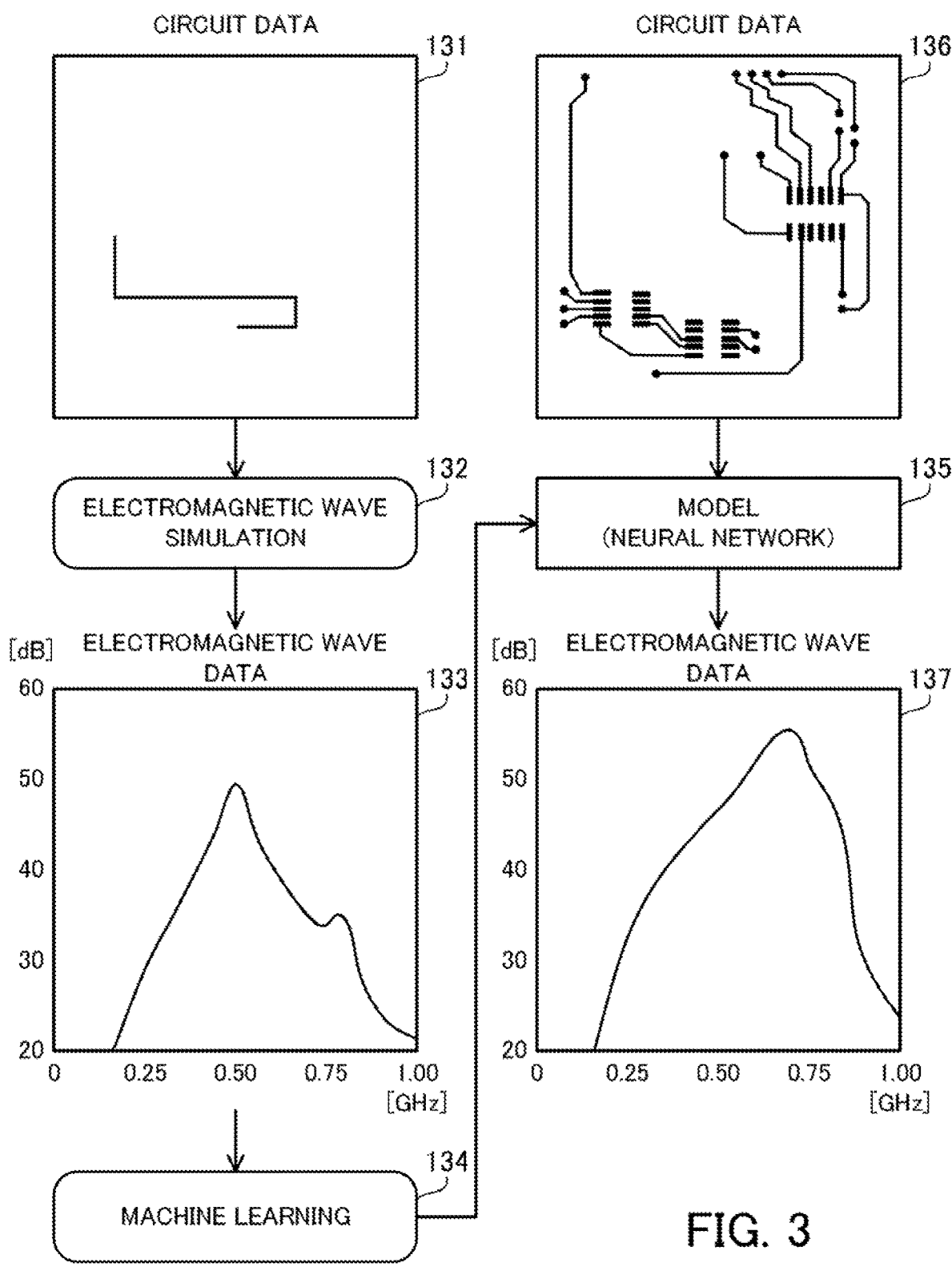
FIG. 3 depicts example estimation of the intensity of electromagnetic waves using machine learning.

FIG. 3 depicts example estimation of the intensity of electromagnetic waves using machine learning. The information processing apparatus 100 generates circuit data 131 for machine learning. The circuit data 131 includes a pattern indicating the position and form of wiring. The wiring indicated by the circuit data 131 may be relatively simple wiring. The information processing apparatus 100 executes an electromagnetic wave simulation 132 on the circuit data 131 to generate electromagnetic wave data 133. The electromagnetic wave simulation 132 is a physical simulation that calculates the intensity of the electromagnetic waves emitted from an electronic circuit indicated by the circuit data 131 when a current flows through the electronic circuit. The computational load of the electromagnetic wave simulation 132 is large and execution may take a long time.

The electromagnetic wave simulation 132 may be a three-dimensional finite element simulation. As one example, the information processing apparatus 100 subdivides the space in which the electronic circuit is arranged into elements that are small three-dimensional regions, and assigns variables to the nodes of these elements. The information processing apparatus 100 generates a coefficient matrix indicating the relationship between the variables based on the governing equations indicating the physical laws of electromagnetic waves. The information processing apparatus 100 finds a solution for the variables by repeating a matrix operation using the coefficient matrix.

The electromagnetic wave data 133 indicates the intensity of electromagnetic waves at a position a predetermined distance from the electronic circuit. The electromagnetic wave data 133 indicates the electromagnetic wave intensities of different frequencies. As one example, one hundred frequencies are extracted at 0.01 GHz intervals in a frequency range from 0 GHz to 1 GHz. As one example, the electromagnetic wave data 133 is vector data in which numerical values of one hundred electromagnetic wave intensities are listed corresponding to one hundred frequencies.

The information processing apparatus 100 generates training data including input data corresponding to the circuit data 131 and teacher data corresponding to the electromagnetic wave data 133. The input data corresponds to the explanatory variables of the model, and the teacher data corresponds to the objective variables of the model. The input data is feature data which expresses the features of the wiring of the electronic circuit. The information processing apparatus 100 generates a plurality of pairs of circuit data 131 and electromagnetic wave data 133 by changing the wiring of the electronic circuit. By doing so, the information processing apparatus 100 generates training data including a substantial number of records.

The information processing apparatus 100 executes machine learning 134 using the generated training data. The machine learning 134 is deep learning that generates a model 135. The model 135 is a neural network, as one example a convolutional neural network that includes a convolution operation. The machine learning 134 includes error backpropagation.

As one example, the information processing apparatus 100 selects a record from the training data, inputs the input data included in the record into the model 135, and calculates the error between the output of the model 135 and the teacher data included in the record. As one example, the error is the mean square error between two vectors in which one hundred values of electromagnetic wave intensity are included. The information processing apparatus 100 updates the parameters included in the model 135 so that the error is reduced. The parameters include the edge weights of the neural network. The information processing apparatus 100 calculates an error gradient of the edge weights in order from the output layer of the model 135 toward the input layer, and updates the weights based on an error gradient. By doing so, the model 135 is generated.

The information processing apparatus 100 receives circuit data 136 indicating an electronic circuit under design from the user. The circuit data 136 includes a pattern indicating the position and form of wiring. The wiring indicated by the circuit data 136 may be more complex than the circuit data 131. The information processing apparatus 100 generates input data corresponding to the circuit data 136 and inputs the generated input data into the model 135 to generate electromagnetic wave data 137.

The input data corresponding to the circuit data 136 is feature data expressing the features of the wiring of the electronic circuit under design. The electromagnetic wave data 137 indicates estimated values of the intensity of the electromagnetic waves emitted by the electronic circuit under design at a position a predetermined distance from the electronic circuit. As one example, the electromagnetic wave data 137 is vector data in which the numerical values of one hundred electromagnetic wave intensities corresponding to one hundred frequencies between 0 GHz and 1 GHz are listed.

Thanks to this, a designer of electronic circuits is freed from having to implement an electronic circuit based on the circuit data 136 simply for the purpose of measuring the intensity of electromagnetic waves. There is also no need for the information processing apparatus 100 to execute the electromagnetic wave simulation 132 for the circuit data 136, which would have a large computational load. Accordingly, the designer is able to quickly obtain electromagnetic wave data for various potential designs. Next, processing of the training data to improve the accuracy of the model 135 will be described.

Figure 4:
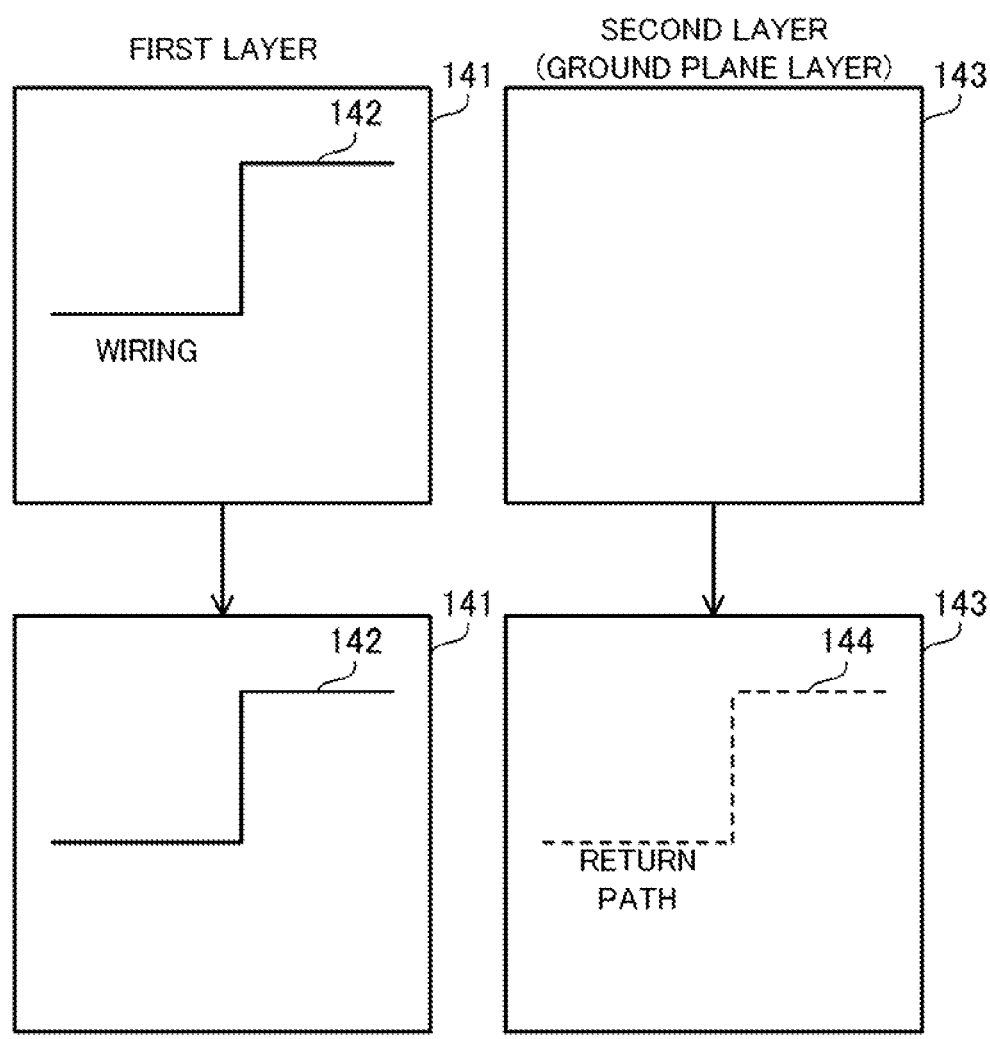
FIG. 4 depicts a first example of generation of a return current in a ground layer.

FIG. 4 depicts a first example of generation of a return current in a ground layer. The physical structure of an electronic circuit may include multiple layers. The layer adjacent to a wiring layer including wiring may be a ground plane layer, which is a ground layer where empty regions are covered with a conductor. As one example, a first layer may be a wiring layer and a second layer may be a ground plane layer.

A pattern 141 indicates a wiring layer. The pattern 141 includes wiring 142. A pattern 143 indicates a ground plane layer that is adjacent to the wiring layer. The pattern 143 does not include wiring. When a current flows through the wiring 142, a return current flows through the ground plane layer adjacent to the wiring layer. Accordingly, a return path 144 is formed on the pattern 143. As a general rule, the position and form of the return path 144 are the same as the wiring 142. That is, as a general rule, the return current flows directly below or directly above the wiring 142.

Figure 5:
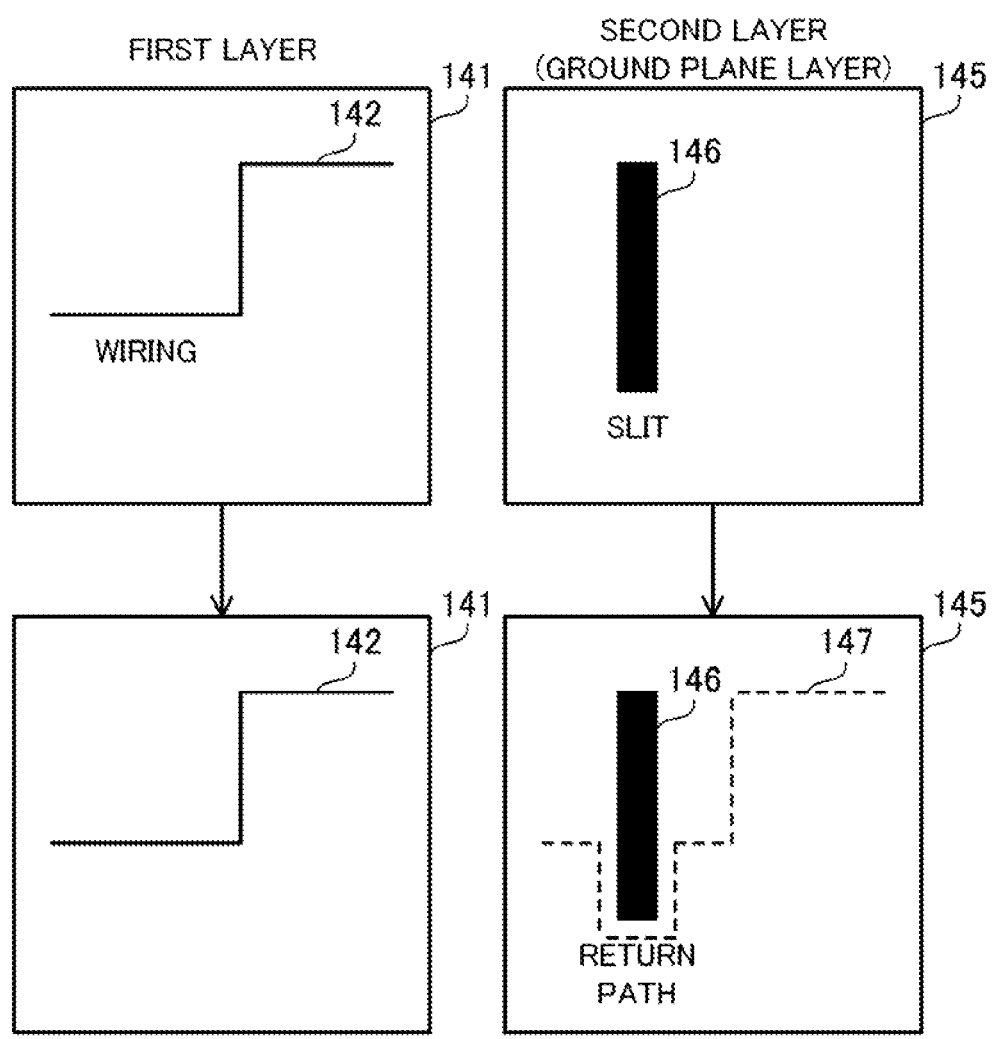
FIG. 5 depicts a second example of generation of a return current in a ground layer.

FIG. 5 depicts a second example of generation of a return current in a ground layer. Here, instead of the ground plane layer of the pattern 143, a ground plane layer of a pattern 145 is adjacent to the wiring layer of the pattern 141. The pattern 145 includes a slit 146. The slit 146 is a region that is not covered by a conductor. When the slit 146 is rectangular, three or four sides of the slit 146 will normally be in contact with a conductor region.

When a current flows through the wiring 142, a return path 147 is formed on the pattern 145. As described earlier, as a general rule, the position and form of the return path will be the same as the wiring 142. However, for the pattern 145, a line that in the same as the wiring 142 would cross the slit 146. Since no current flows at the slit 146, the return path 147 bypasses the slit 146. In this way, the position and form of the return path may differ to the wiring 142.

When bypassing an obstacle, the return current tends to flow on a path with low resistance. On the other hand, the periphery of the slit 146 in the pattern 145 is covered with a conductor which has uniform electrical properties, such as resistance. Accordingly, the return path 147 will bypass the slit 146 using the shortest path. In more detail, a bypass route is formed so as to connect two end points, where a line that is the same as the wiring 142 would intersect the edges of the slit 146, using the shortest path. For the example in FIG. 5, there is a bypass route that passes around the upper side of the slit 146 in the drawing and a bypass route that passes around the lower side of the slit 146. Out of these two bypass routes, the latter bypass route which is shorter is selected.

Here, it would be conceivable for the information processing apparatus 100 to generate image data indicating wiring for each layer of the electronic circuit and define a set of image data as input data into the model. However, a return path is a dynamic current path that appears when a current flows through the wiring of an adjacent wiring layer and is not indicated as wiring in circuit data. Also, the position and term of a return path is not always the same as the wiring on the adjacent wiring layer. This means that a set of image data indicating wiring on its own will lack information on return currents. In spite of this, return currents will still affect the intensity of electromagnetic waves emitted from an electronic circuit. This results in the risk of a fall in the accuracy of a model. For this reason, the information processing apparatus 100 edits the image data of the ground plane layer.

Figure 6:
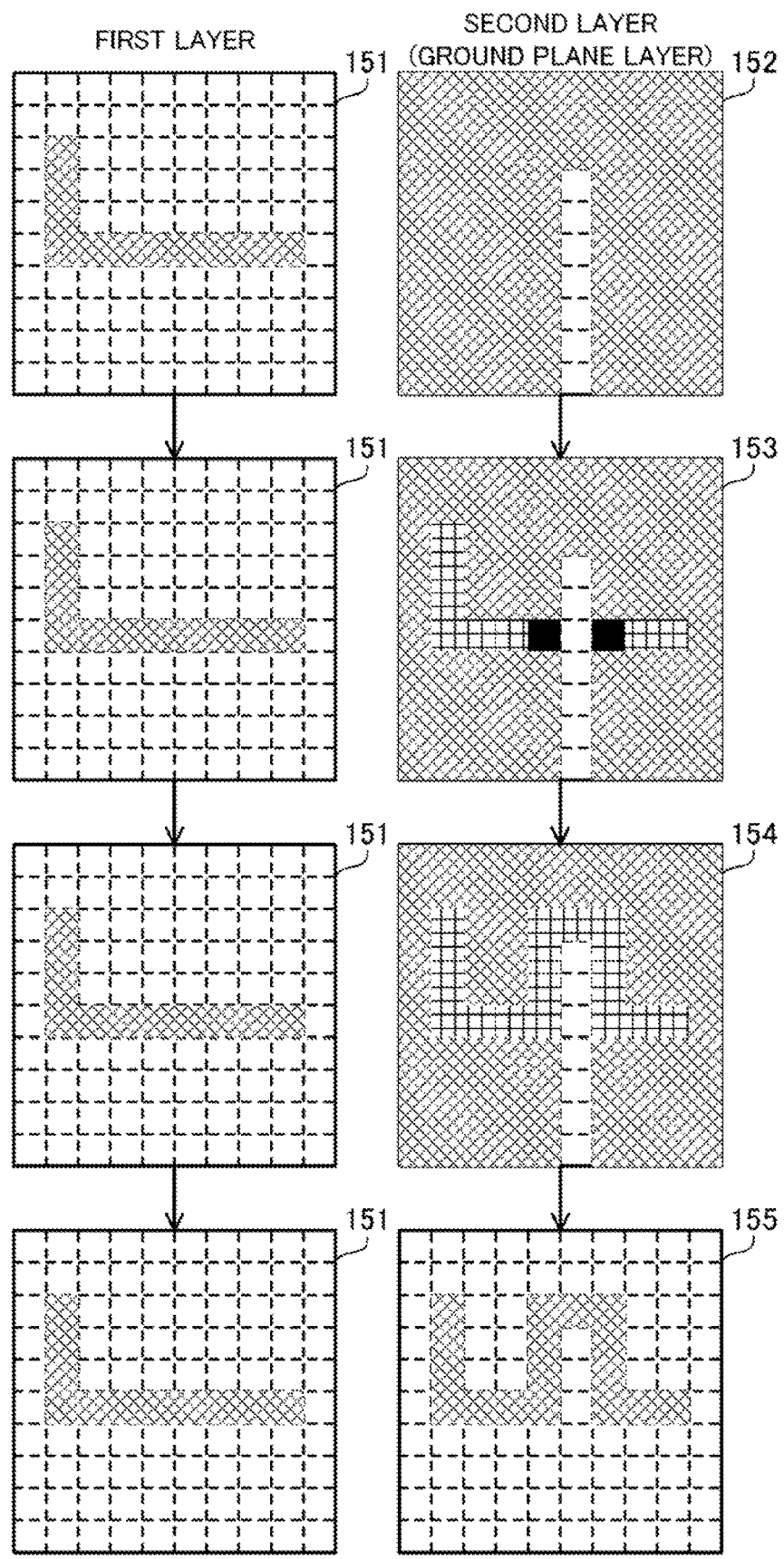
FIG. 6 depicts example calculation of a return path.

FIG. 6 depicts example calculation of a return path. Image data 151 is generated from the pattern of a wiring layer that includes wiring. Image data 152 is generated from the pattern of a ground plane layer adjacent to the wiring layer. The information processing apparatus 100 divides the pattern into small regions in an orthogonal grid. As one example, the information processing apparatus 100 divides the pattern into one hundred vertical by one hundred horizontal small regions. The information processing apparatus 100 assigns a value indicating a conductor as an element to small regions that include a conductor. The information processing apparatus 100 assigns a value indicating a non-conductor as an element to small regions that do not include a conductor.

The image data 151 and 152 are matrix data in which the elements assigned as described above have been arranged on a two-dimensional plane. In the image data 151, elements at positions where wiring is present indicate a conductor and the other elements indicate a non-conductor. In the image data 152, elements at positions where a slit is present indicate a non-conductor and the other elements indicate a conductor.

Next, the information processing apparatus 100 processes the image data 152 corresponding to the ground plane layer. The information processing apparatus 100 detects an element indicating a conductor from the image data 151 and extracts an element at the same position from the image data 152. When the extracted element indicates a conductor, the information processing apparatus 100 rewrites the value of the extracted element to a value indicating a return path. However, when the extracted element indicates a non-conductor, the information processing apparatus 100 does net rewrite the value of the extracted element. Also, out of the elements indicating the return path, the information processing apparatus 100 rewrites the value of an element adjacent to elements indicating a non-conductor to the value indicating an end point. By doing so, the image data 152 is converted into the image data 153. In addition to elements indicating a conductor and elements indicating a non-conductor, the image data 153 includes elements indicating a return path and elements indicating end points.

Next, in the image data 153, the information processing apparatus 100 searches for a bypass route, which is the shortest path that connects two elements indicating end points and passes only elements indicating a conductor. A route searching algorithm, such as Dijkstra's algorithm, is used to search for the shortest path. The information processing apparatus 100 rewrites the values of the elements belonging to the shortest path found in this way to the value indicating the return path. By doing so, the image data 153 is converted into the image data 154. The image data 154 includes elements indicating a conductor, elements indicating a non-conductor, and elements indicating a return path.

The information processing apparatus 100 then rewrites the values of elements indicating a conductor included in the image data 154 to the value indicating a non-conductor. The information processing apparatus 100 also rewrites the values of the elements indicating the return path included in the image data 154 to the value indicating a conductor. By doing so, the image data 154 is converted into the image data 155. The image data 155 includes elements indicating a conductor and elements indicating a non-conductor. Elements that indicate a conductor represent small regions through which current may flow and form a return path. The elements indicating a non-conductor indicate small regions where no current flows. In this respect, the elements of the image data 155 have a meaning that is consistent with the image data 151.

As one example, the information processing apparatus 100 expresses elements indicating a conductor with "1" and elements indicating a non-conductor with "0". The information processing apparatus 100 generates input data including the image data 151 and 155. As one example, the information processing apparatus 100 generates a tensor with one hundred vertical by one hundred horizontal elements on two channels as input data for a model.

Figure 7:
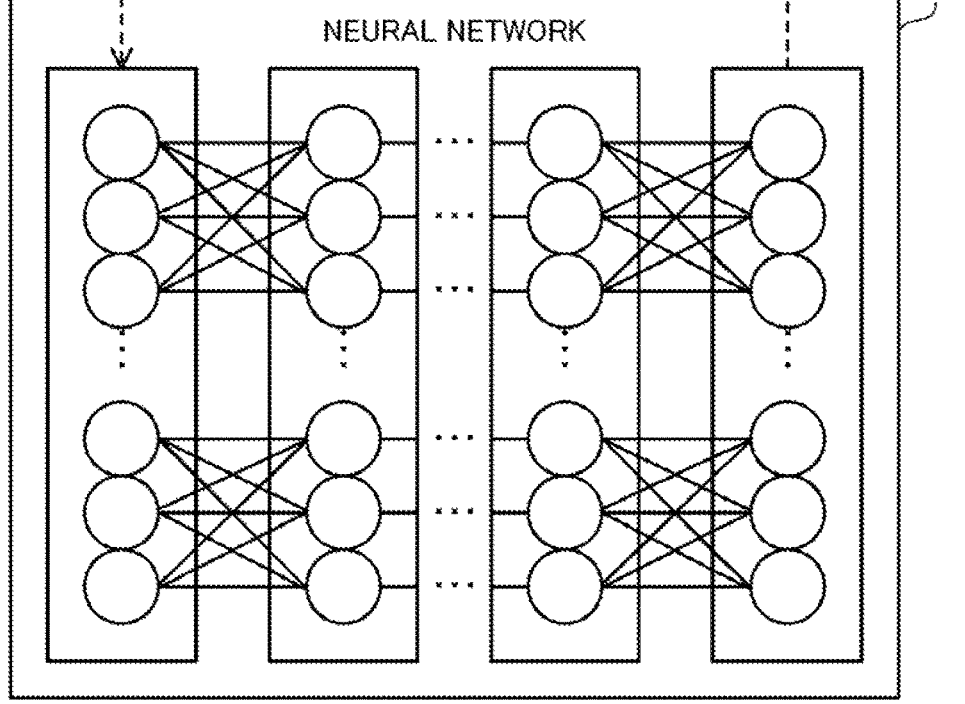
FIG. 7 depicts an example of input/output data for a neural network.

FIG. 7 depicts an example of input/output data for a neural network. The neural network 160 is an example of the model 135 described earlier. The neural network 160 is a multi-layer neural network including an input layer, an output layer, and one or more intermediate layers. Each layer includes a plurality of nodes. Nodes on the input layer have edges with nodes on an intermediate layer immediately behind the input layer. Nodes on the output layer have edges with nodes on an intermediate layer immediately before the output layer. Nodes in each intermediate layer have edges with nodes in the immediately preceding and following layers. Parameters indicating weights are assigned to the edges. These weights are determined through machine learning. The neural network 160 is a convolutional neural network where a convolution operation is implemented. The convolution operation repeats a sum-of-products operation while sliding a filter matrix called a "kernel" over the input tensor to generate a tensor called a "feature map".

A tensor 161 is inputted into the neural network 160. The size of the tensor 161 is one hundred vertical by one hundred horizontal elements on two channels. The tensor 161 includes the image data 151 and 155 described earlier. A tensor 162 is outputted from the neural network 160. The size of the tensor 162 is one hundred vertical by one horizontal elements on one channel. Accordingly, the tensor 162 corresponds to a column vector. The tensor 162 includes numerical values indicating one hundred electromagnetic wave intensities corresponding to one hundred frequencies.

Machine learning that determines the edge weights of the neural network 160 is performed by backpropagation. Backpropagation includes a forward phase, a backward phase, and an update phase. The forward phase inputs the input data included in the training data into the input layer and multiplies each input value by a weight to compute output values in the forward direction from the input layer toward the output layer, thereby generating the output data. The backward phase calculates the error between the output data and the teacher data contained in the training data, propagates error information in the opposite direction from the output layer toward the input layer, and calculates an error gradient for the weights of the edges. The update phase updates the weights based on the error gradient and a predetermined learning rate. The forward phase, backward phase, and update phase described above are executed iteratively.

Note that the information processing apparatus 100 may further edit the binary image data where the element values are 0 or 1. As one example, the information processing apparatus 100 may replace a value indicating wiring or a return path with a numerical value indicating the length of the wiring or the return path. The information processing apparatus 100 may also convert values of elements in the periphery of wiring or a return path into numerical values that gradually attenuate as the distance from the wiring or return path increases. The image data processed in this way approximates the electromagnetic wave intensity in the vicinity of the wiring or the return path.

Figure 8:
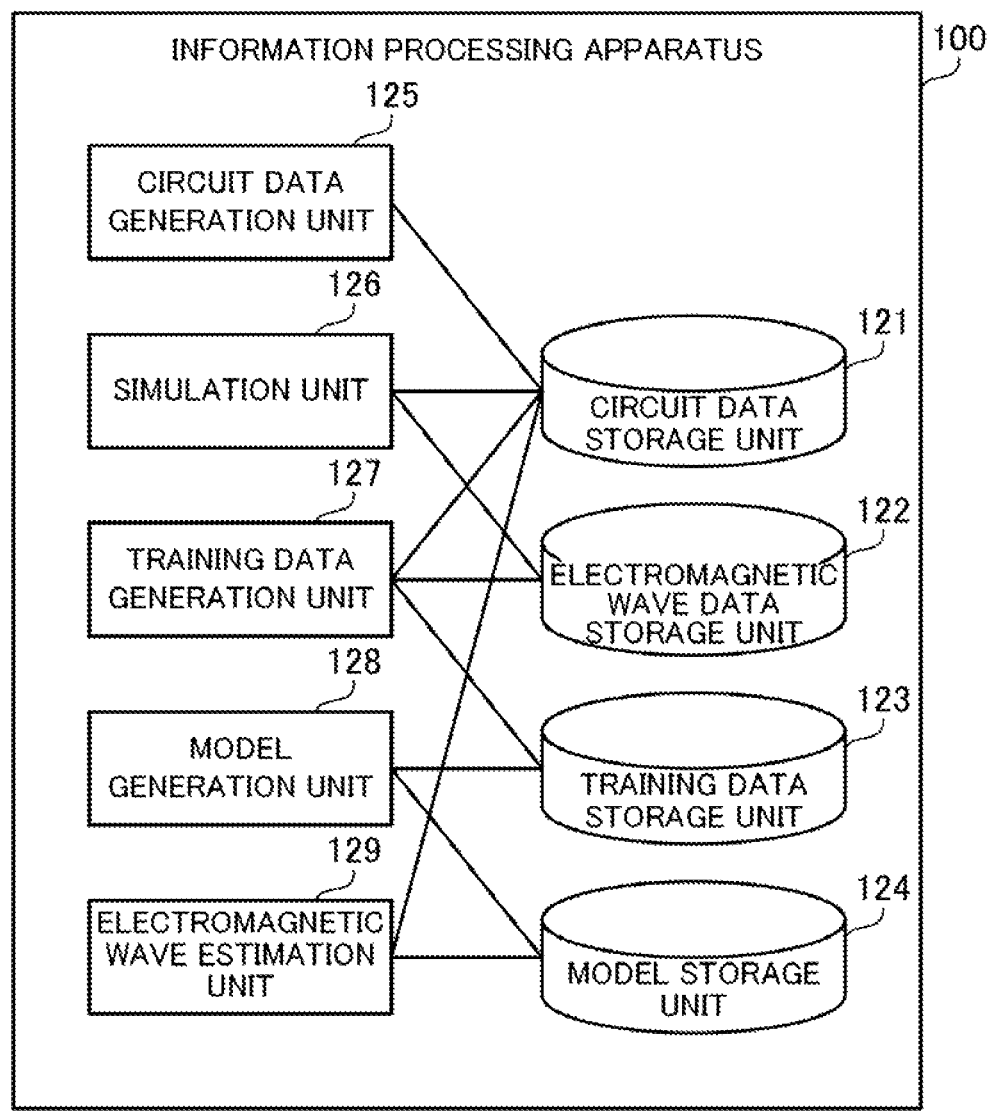
FIG. 8 is a block diagram depicting example functions of the information processing apparatus according to the second embodiment.

Next, the functions and the processing procedure of the information processing apparatus 100 will be described. FIG. 8 is a block diagram depicting example functions of the information processing apparatus according to the second embodiment. The information processing apparatus 100 includes a circuit data storage unit 121, an electromagnetic wave data storage unit 122, a training data storage unit 123, and a model storage unit 124. The storage unit described above is implemented using the storage area of the RAM 102 or the HDD 103, for example. The information processing apparatus 100 includes a circuit data generation unit 125, a simulation unit 126, a training data generation unit 127, a model generation unit 128, and an electromagnetic wave estimation unit 129. The processing unit described above is implemented using a program, for example.

The circuit data storage unit 121 stores sample circuit data used for machine learning. The circuit data storage unit 121 also stores circuit data of an electronic circuit under design. The electromagnetic wave data storage unit 122 stores electromagnetic wave data indicating the electromagnetic wave intensity at positions a predetermined distance from the electronic circuit in association with the sample circuit data stored in the circuit data storage unit 121. This electromagnetic wave data corresponds to teacher data.

The training data storage unit 123 stores training data used in machine learning. The training data includes a plurality of records in which input data indicating circuit structure and teacher data indicating electromagnetic wave intensity are associated with each other. The model storage unit 124 stores a model generated from the training data by machine learning. The model is a neural network.

The circuit data generation unit 125 generates sample circuit data and stores the sample circuit data in the circuit data storage unit 121. The circuit data generation unit 125 generates, based on predetermined rules, circuit data including a wiring layer that includes wiring and a ground plane layer that includes slits. The circuit data generation unit 125 generates various circuit data by changing the positions and forms of the wiring and the positions and sizes of the slits. The positions of the wiring, the form of the wiring, the positions of the slits, and the sizes of the slits are each selected from a plurality of candidates prepared in advance.

The simulation unit 126 executes an electromagnetic wave simulation for each set of sample circuit data stored in the circuit data storage unit 121. As one example, the electromagnetic wave simulation is a three-dimensional finite element simulation that calculates the electromagnetic wave intensity in the periphery of an electronic circuit. The simulation unit 126 generates electromagnetic wave data indicating the electromagnetic wave intensity at a position a predetermined distance from the electronic circuit, and stores the electromagnetic wave data in the electromagnetic wave data storage unit 122.

The training data generation unit 127 generates an input tensor including image data of each layer from the sample circuit data stored in the circuit data storage unit 121. From the electromagnetic wave data stored in the electromagnetic wave data storage unit 122, the training data generation unit 127 generates an output tensor listing a plurality of electromagnetic wave intensities corresponding to a plurality of frequencies. The training data generation unit 127 generates training data including a plurality of records in which an input tensor and an output tensor are associated with each other, and stores the training data in the training data storage unit 123.

The model generation unit 128 generates a model by machine learning using the training data stored in the training data storage unit 123, and stores the generated model in the model storage unit 124. The model is a neural network, and the machine learning is deep learning. In the machine learning, the weights included in a neural network are determined by backpropagation.

The electromagnetic wave estimation unit 129 reads out the circuit data of the electronic circuit under design from the circuit data storage unit 121. The electromagnetic wave estimation unit 129 generates an input tensor from the circuit data according to the same method as the training data generation unit 127. The electromagnetic wave estimation unit 129 inputs the input tensor into the model stored in the model storage unit 124 and acquires an output tensor indicating electromagnetic wave intensity. The electromagnetic wave estimation unit 129 outputs the electromagnetic wave data indicating the estimated electromagnetic wave intensity. The electromagnetic wave estimation unit 129 may display the estimated electromagnetic wave data on the display apparatus 111, store the estimated electromagnetic wave data in the electromagnetic wave data storage unit 122, and/or transmit the estimated electromagnetic wave data to another information processing apparatus.

Figure 9:
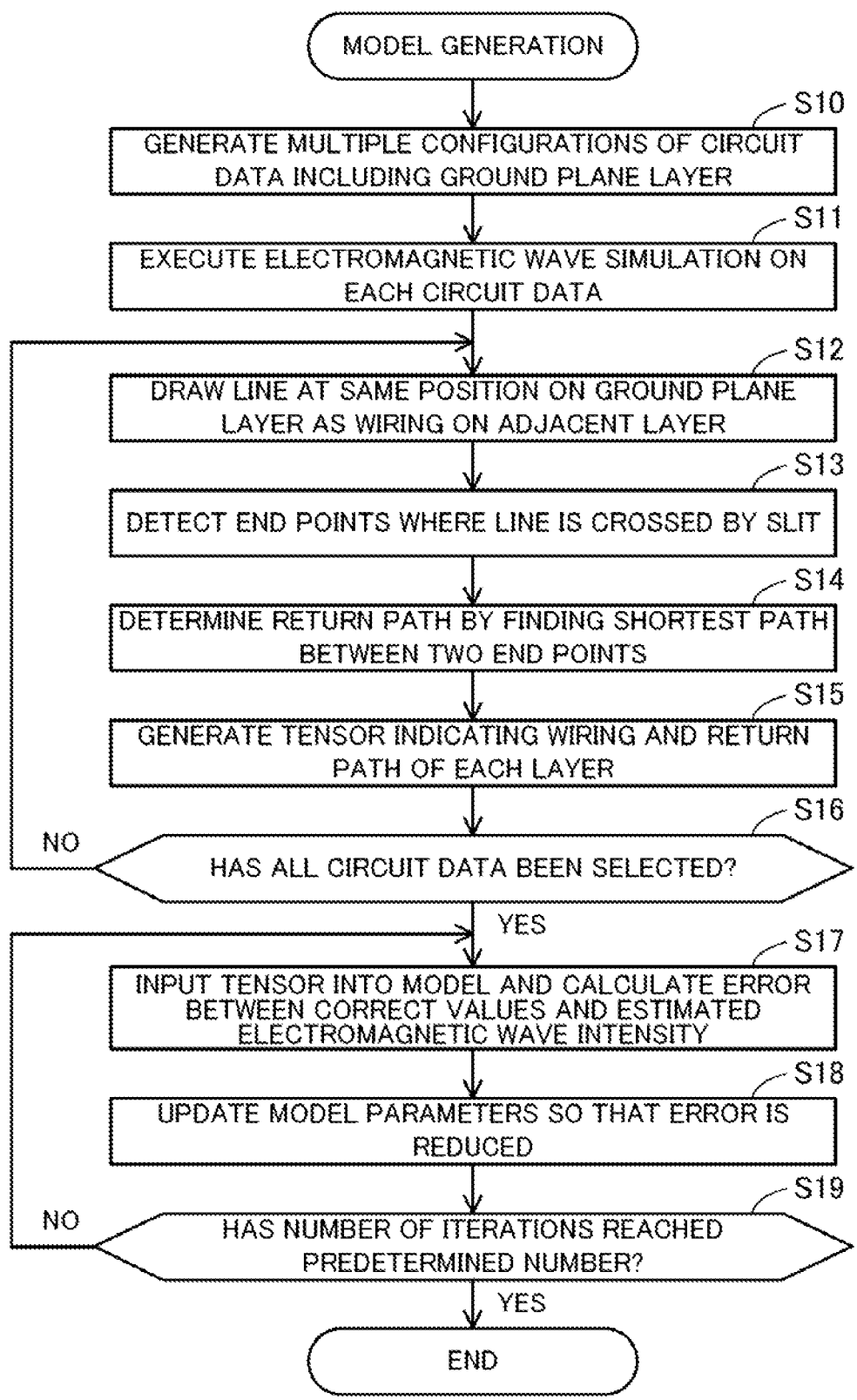
FIG. 9 is a flowchart indicating an example procedure of model generation.

FIG. 9 is a flowchart indicating an example procedure of model generation. The circuit data generation unit 125 generates circuit data including a wiring layer and a ground plane layer in a plurality of configurations by changing the wiring and the slits (S10). The simulation unit 126 executes an electromagnetic wave simulation according to a three-dimensional finite element method on each set of circuit data generated in step S10. By doing so, the simulation unit 126 generates electromagnetic wave data indicating the electromagnetic wave intensity at a position a predetermined distance from the electronic circuit for each set of circuit data (S11).

The training data generation unit 127 selects one of the circuit data generated in step S10. The training data generation unit 127 converts the respective patterns of the plurality of layers indicated by the selected circuit data into image data indicating conductor regions. The training data generation unit 127 draws a line in the image data of the ground plane layer at the same position as the wiring of the adjacent wiring layer (S12).

In the image data of the ground plane layer, the training data generation unit 127 detects any end points where the line drawn in step S12 is divided (crossed) by a slit (S13). The training data generation unit 127 searches for the shortest path that joins end points on both sides of the same slit and bypasses the slit. By doing so, the training data generation unit 127 determines, in the image data of the ground plane layer, the return path through which the return current flows when a current flows through the wiring of the wiring layer (S14).

The training data generation unit 127 converts the image data of the ground plane layer so that the image data indicates a return path. The training data generation unit 127 generates a tensor including the image data of the wiring layer and the image data of the ground plane layer. The training data generation unit 127 associates the tensor of the circuit image with the electromagnetic wave data generated in step S11 from the selected circuit data and adds the associated data to the training data (S15). The training data generation unit 127 determines whether every set of circuit data has been selected in step S12. When all of the circuit data has been selected, the processing proceeds to step S17, and when there is unselected circuit data, the process returns to step S12 (S16).

The model generation unit 128 extracts a pair of a tensor of a circuit image and electromagnetic wave data from the training data. The model generation unit 128 inputs the tensor of the circuit image into the model and acquires the estimated electromagnetic wave intensity outputted by the model. The model generation unit 128 calculates the error between the correct values of the electromagnetic wave intensity indicated by the electromagnetic wave data extracted from the training data and the estimated electromagnetic wave intensity (S17). The model generation unit 128 updates the model parameters so that the error is reduced (S18).

The model generation unit 128 determines whether the number of iterations in steps S17 and S18 has reached a predetermined number. When the number of iterations reaches the predetermined number, the model generation unit 128 stores the model and ends the machine learning. When the number of iterations has not reached the predetermined number, the processing returns to step S17 (S19). Note that it is also possible to set a different stop condition aside from the number of iterations. As one example, the stop condition may be that the error has fallen below a threshold value.

Figure 10:
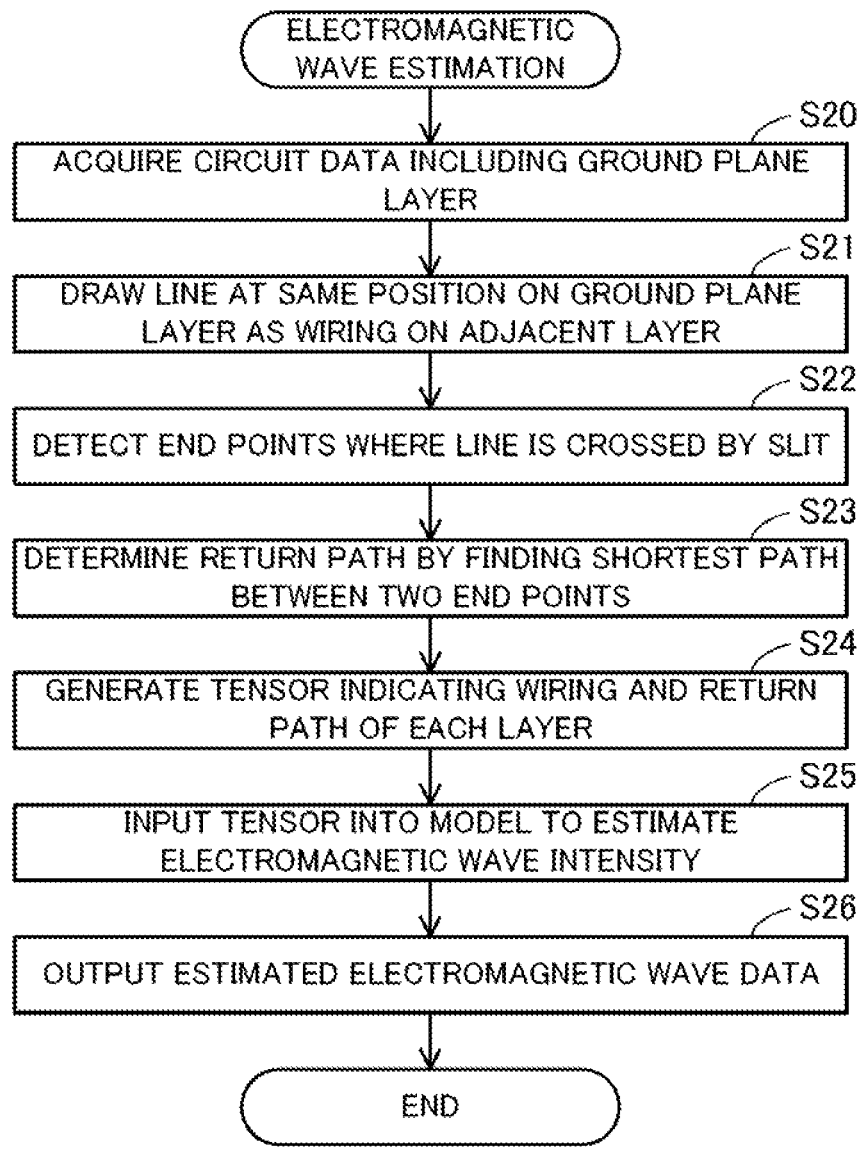
FIG. 10 is a flowchart depicting an example procedure of estimation of electromagnetic waves.

FIG. 10 is a flowchart depicting an example procedure of estimation of electromagnetic waves. The electromagnetic wave estimation unit 129 acquires circuit data of the electronic circuit under design, which includes a wiring layer and a ground plane layer (S20). The electromagnetic wave estimation unit 129 converts the respective patterns of the plurality of layers indicated by the acquired circuit data into image data indicating conductor regions. The electromagnetic wave estimation unit 129 draws lines on the image data of the ground plane layer at the same position as the wiring of the adjacent wiring layer (S21).

In the image data of the ground plane layer, the electromagnetic wave estimation unit 129 detects any end points where a line drawn in step S21 is crossed by a slit (S22). The electromagnetic wave estimation unit 129 searches for the shortest path that joins end points on both sides of the same slit and bypasses the slit. By doing so, the electromagnetic wave estimation unit 129 determines, in the image data of the ground plane layer, the return path through which the return current flows when a current flows through the wiring of the wiring layer (S23).

The electromagnetic wave estimation unit 129 converts the image data of the ground plane layer so that the image data indicates a return path. The electromagnetic wave estimation unit 129 generates a tensor including the image data of the wiring layer and the image data of the ground plane layer (S24). The electromagnetic wave estimation unit 129 inputs the tensor of the circuit image into the model and estimates the electromagnetic wave intensity (S25). The electromagnetic wave estimation unit 129 generates and outputs estimated electromagnetic wave data indicating the estimated electromagnetic wave intensity. As one example, the electromagnetic wave estimation unit 129 displays the estimated electromagnetic wave data on the display apparatus 111 (S26).

As described above, the information processing apparatus 100 according to the second embodiment generates, by machine learning, a model for estimating the electromagnetic wave intensity from image data indicating the patterns of an electronic circuit. The information processing apparatus 100 then estimates the electromagnetic wave intensity of an electronic circuit under design using the generated model. By doing so, a designer of electronic circuits is freed from having to implement the electronic circuit under design and measure the electromagnetic wave intensity. There is also no need for the information processing apparatus 100 to execute an electromagnetic wave simulation with a large computational load for the electronic circuit under design. This means that the designer is able to quickly obtain information on electromagnetic wave intensity for various designs of electromagnetic circuits.

Out of the inputs into the model, image data corresponding to a ground plane layer includes virtual wiring indicating return paths on which return currents flow. This enables the model to consider the influence of return currents on the intensity of electromagnetic waves, which improves the estimation accuracy for the intensity of electromagnetic waves. When the ground plane layer includes a slit, the information processing apparatus 100 searches the image data for the shortest path that bypasses the slit to determine the virtual wiring. Accordingly, the image data of the ground plane layer accurately expresses the return path, which improves the accuracy of the model.

According to the present embodiments, it is possible to improve the estimation accuracy for emitted electromagnetic waves.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program executable by one or more computers, the computer program comprising:
   an instruction for specifying a first pattern indicating a first layer included in first circuit data;
   an instruction for generating, based on first wiring included in a second pattern indicating a second layer that is adjacent to the first layer and a slit included in the first pattern, second circuit data by changing the first pattern to a third pattern including second wiring corresponding to the first wiring; and
   an instruction for generating, based on the second circuit data, training data for machine learning to train a machine learning model that estimates emission of electromagnetic waves, the training data including as input of the machine learning model a first bitmap image that indicates the first wiring of the second layer and a second bitmap image that indicates the second wiring of the first layer.

2. The non-transitory computer-readable recording medium according to claim 1, wherein the generating of the second circuit data includes
specifying a path of a return current that flows in the first layer when a current flows in the first wiring and determining the second wiring indicating the path of the return current.

3. The non-transitory computer-readable recording medium according to claim 1, wherein the generating of the second circuit data includes
detecting, in the first pattern, intersections between the slit and a line corresponding to the first wiring, and
determining the second wiring indicating a bypass route that joins points adjacent to the intersections and bypasses the slit.

4. The non-transitory computer-readable recording medium according to claim 1, wherein the first layer is a ground layer where a region other than the slit is covered with a conductor.

5. The non-transitory computer-readable recording medium according to claim 1, the computer program further comprising an instruction for training, based on the training data, the machine learning model.

6. A computer-implemented training data generating method comprising:
specifying a first pattern indicating a first layer included in first circuit data;
generating, based on first wiring included in a second pattern indicating a second layer that is adjacent to the first layer and a slit included in the first pattern, second circuit data by changing the first pattern to a third pattern including second wiring corresponding to the first wiring; and
generating, based on the second circuit data, training data for machine learning to train a machine learning model that estimates emission of electromagnetic waves, the training data including as input of the machine learning model a first bitmap image that indicates the first wiring of the second layer and a second bitmap image that indicates the second wiring of the first layer.

7. The computer-implemented training data generating method according to claim 6, wherein the generating of the second circuit data includes
specifying a path of a return current that flows in the first layer when a current flows in the first wiring and determining the second wiring indicating the path of the return current.

8. The computer-implemented training data generating method according to claim 6, wherein the generating of the second circuit data includes
detecting, in the first pattern, intersections between the slit and a line corresponding to the first wiring, and
determining the second wiring indicating a bypass route that joins points adjacent to the intersections and bypasses the slit.

9. The computer-implemented training data generating method according to claim 6, wherein the first layer is a ground layer where a region other than the slit is covered with a conductor.

10. The computer-implemented training data generating method according to claim 6, the method further comprising training, based on the training data, the machine learning model.

11. A computing system comprising:
a memory that stores therein first circuit data including a first pattern, which indicates a first layer, and a second pattern, which indicates a second layer that is adjacent to the first layer; and
a processor coupled to the memory, the processor being configured to
generate, based on first wiring included in the second pattern and a slit included in the first pattern, second circuit data by changing the first pattern to a third pattern including second wiring corresponding to the first wiring, and
generate, based on the second circuit data, training data for machine learning to train a machine learning model that estimates emission of electromagnetic waves, the training data including as input of the machine learning model a first bitmap image that indicates the first wiring of the second layer and a second bitmap image that indicates the second wiring of the first layer.

* * * * *